Oct. 12, 1965  J. W. COLVIN  3,211,465
ROLLING LIQUID TRANSPORTER
Filed Sept. 4, 1963  7 Sheets-Sheet 1

Fig. 1

INVENTOR.
JAMES W. COLVIN
BY Harry M. Saragovitz,
Edward J. Kelly +
Herbert Berl Oct. 12, 1965      J. W. COLVIN      3,211,465
ROLLING LIQUID TRANSPORTER Filed Sept. 4, 1963      7 Sheets-Sheet 2

Fig. 2

INVENTOR.
JAMES W. COLVIN
BY Harry M. Saragovitz,
Edward J. Kelly, &
Herbert Berl fig. 3

Oct. 12, 1965 J. W. COLVIN 3,211,465
ROLLING LIQUID TRANSPORTER
Filed Sept. 4, 1963 7 Sheets-Sheet 4 fig. 4

INVENTOR.
JAMES W. COLVIN
BY Harry M. Saragovitz,
Edward J. Kelly &
Herbert Berl Oct. 12, 1965

J. W. COLVIN 3,211,465

ROLLING LIQUID TRANSPORTER

Filed Sept. 4, 1963

INVENTOR.
JAMES W. COLVIN
BY Harry M. Saragovitz,
Edward J. Kelly &
Herbert Berl

United States Patent Office 3,211,465
Patented Oct. 12, 1965

3,211,465
ROLLING LIQUID TRANSPORTER
James W. Colvin, Williamsburg, Va., assignor to the United States of America as represented by the Secretary of the Army
Filed Sept. 4, 1963, Ser. No. 306,668
9 Claims. (Cl. 280—5)
(Granted under Title 35, U.S. Code (1952), sec. 266)

The invention hereinbelow described and claimed may be manufactured and used by or for the Government for governmental purposes without the payment to me of any royalty thereon.

The United States Army has developed a transporter for liquids, particularly engine fuel, although it could be used for transporting water, antifreeze, and other liquids, which can be towed by a large variety of Army automotive vehicles. The transporter is of simple construction comprising generally an axle, a towing tongue secured to and extending perpendicularly from the axle at the longitudinal center of the axle, and two pneumatic tired wheels journalled on the axle one at each opposite side of the tongue. The tires are of large volumetric capacity and the liquid load is carried in the tires. Means are provided for filling the tires and for withdrawing liquid from the tires through the hollow axle of the transporter and means are also provided to supply compressed air to the interior of the tires to maintain the tires inflated and to force the liquid out when it is desired to withdraw liquid from the transporter.

The first transporters developed were so designed that liquid could be withdrawn only when the transporter was standing still with the wheels in a predetermined rotational position, such position frequently being indicated by the position of a chalk mark or other indicator on the tire.

After the transporters were put into use, it was found desirable when a transporter was carrying liquid fuel, to be able to withdraw fuel from the transporter tires while the transporter was in motion. There were some prior art devices, such as rolling water tanks, so arranged that water could be discharged from the tank while the device was in motion. These, however, were mostly rigid metal tanks journalled at their ends on fixed tubular axles. In each of these, the axle carried the downwardly projecting tube or hose for guiding liquid from the bottom portion of the tank into the hollow axle and the upwardly extending air tube for directing compressed air from an air conduit in the hollow axle into the upper portion of the tank. As the tanks were substantially rigid, it was feasible to use separate bearings, one at each end of the tank between the tank and the axle, and as the operation of these devices was usually at slow speed, it was possible to use plain bearings which could be effectively sealed against leakage of liquid and air.

When the rolling fluid transporter developed by the Army was modified to provide for removing fuel from the transporter while in motion, the hub sleeve interconnecting the two opposite hub flanges to which the tire beads are secured, was removed so that the fuel conduit and compressed air conduit could project radially from the inner, fixed axle. Since the transporter moves at moderately high speed, 35 to 40 miles per hour, it is necessary to use antifriction ball or roller bearings between the wheel hub and the axle, such bearings being located in the flange structures at the ends of the hub. Removal of the intermediate hub structure or sleeve opened the space at the inner sides of these bearings to access by the fuel in the tire of the wheel. Although much effort was expended in the attempt to provide adequate and effective seals at the inner sides of the bearings, it has not been possible to preclude leakage of fuel into the bearings. This leakage washes the lubricant out of the bearings and causes the bearings to fail within a short period of operation of the transporter.

Removal of the intermediate structure of the hub also took an important support away from the bearing assemblies. As the hub flanges were then interconnected only by the flexible, rubber type tire, the flanges were free to wobble and skew within the limits of bearing tolerance, thus imposing heavy, concentrated loads on the bearings and contributing to bearing failure. There was also no way to distribute or equalize thrust loads on the two bearing assemblies which additionally contributed to early deterioration of the bearings.

The present invention has for an object the provision of a rolling liquid transporter of the character indicated above, so constructed that liquid can be withdrawn or discharged from or fed into the transporter while the transporter is standing still or in motion.

A further object resides in the provision of an improved transporter hub construction where the hub flanges are rigidly held in spaced apart, parallel relationship to each other and the ability of the transporter to receive or discharge liquid while in motion is retained.

A still further object resides in the provision of a rolling liquid transporter wheel wherein the wheel bearings are firmly held in alignment and are protected from leakage of the liquid content of the wheel into the bearings.

An additional object resides in the provision of a rolling liquid transporter which has the capability of receiving and discharging liquid while stationary or in motion and which, at the same time, is capable of extended periods of use and high speed operation without requiring maintenance or repair.

Other objects and advantages will become apparent from a consideration of the following description and the appended claims in conjunction with the accompanying drawings wherein:

Figure 1:
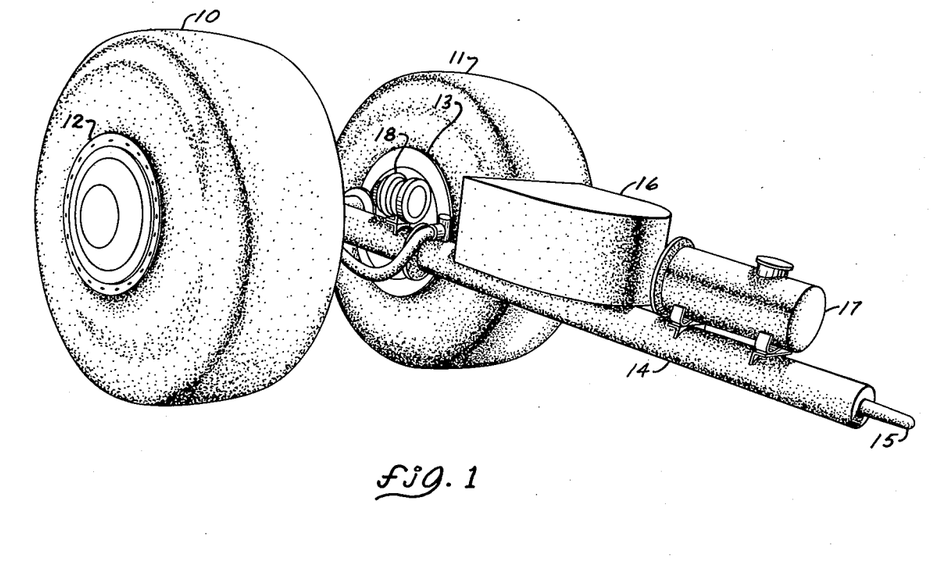
FIG. 1 is a perspective view of a rolling liquid transporter illustrative of the type of transporter to which the present invention is applied.
Figure 2:
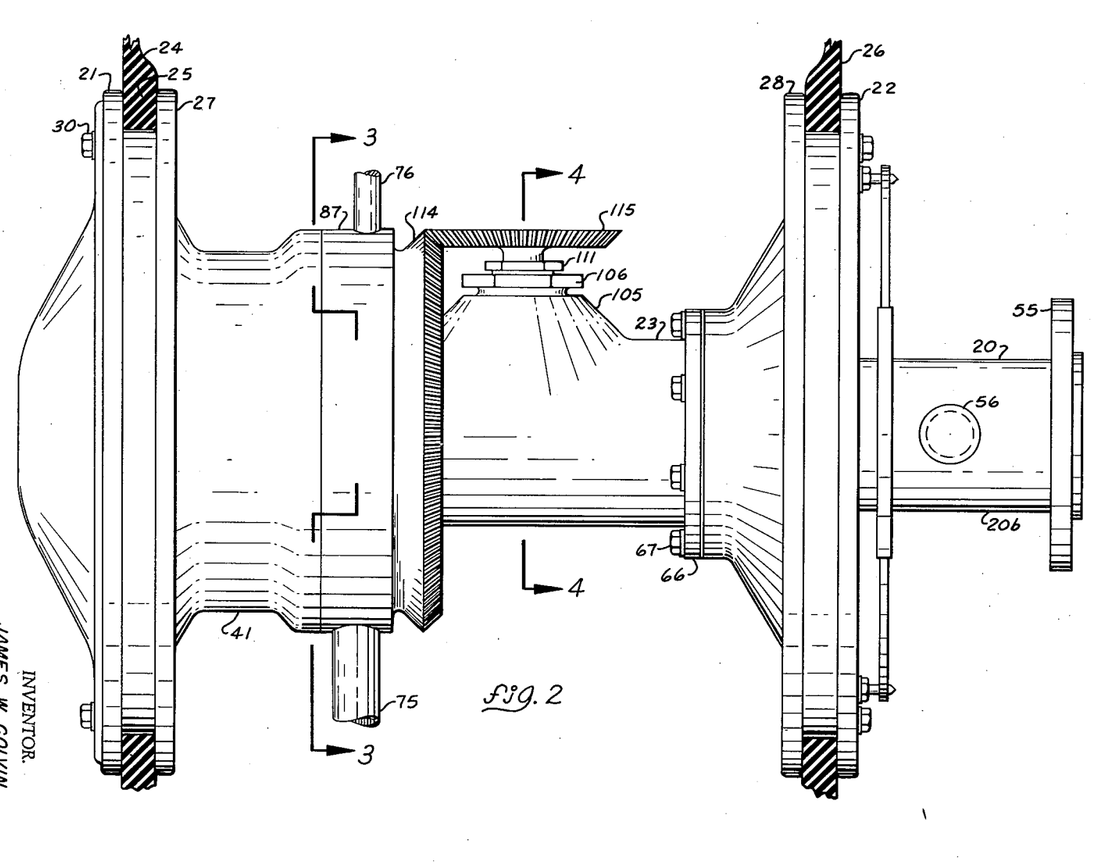
FIG. 2 is an elevational view of one of the wheel hubs of the transporter shown in FIG. 1 with the present invention applied to the hub.
Figure 3:
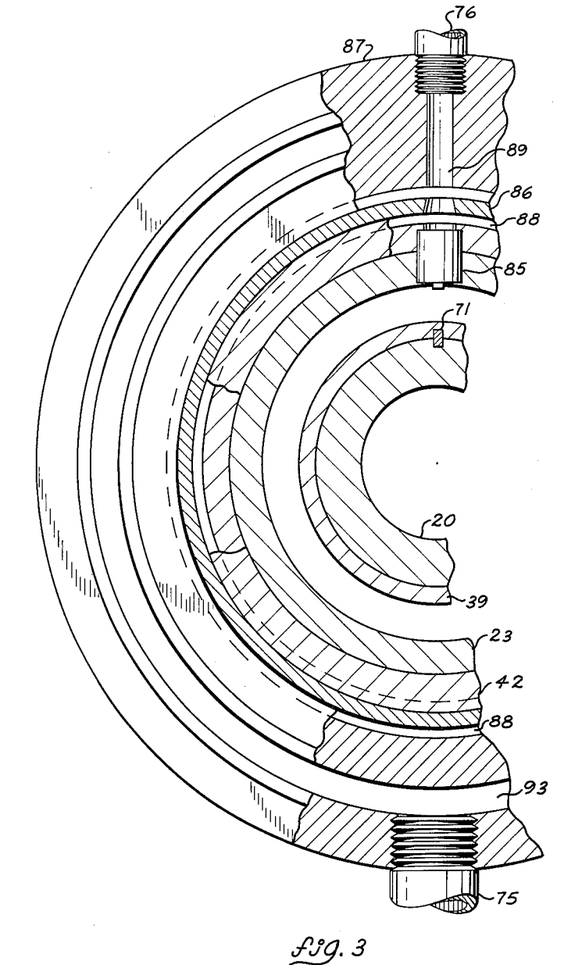
FIG. 3 is a fragmentary cross-sectional view on an enlarged scale substantially on a plane indicated by the line 3—3 on FIG. 2.
Figure 4:
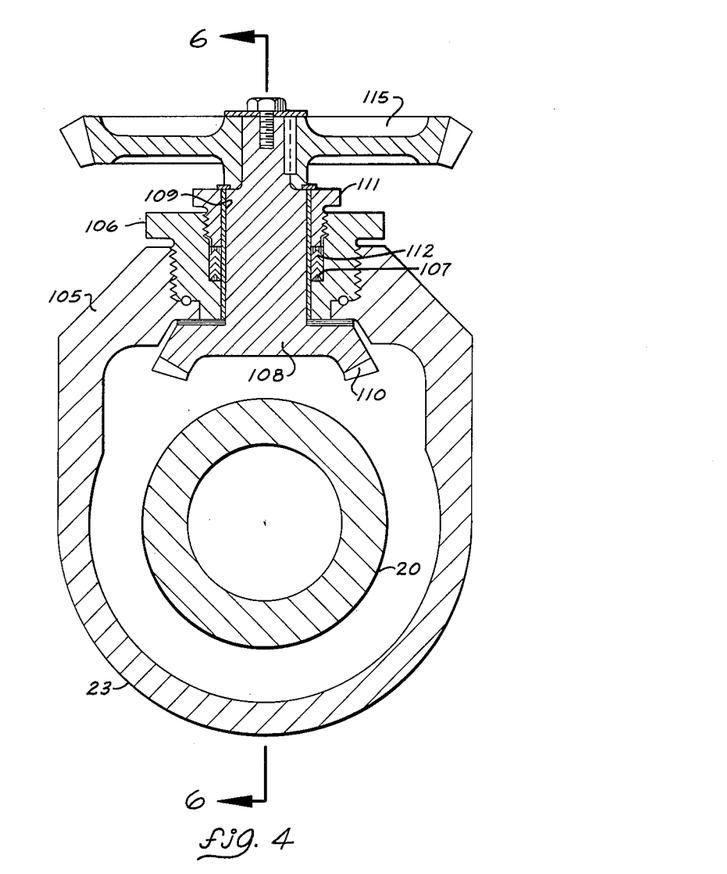
FIG. 4 is a transverse cross-sectional view substantially on a plane indicated by the line 4—4 on FIG. 2.

With continued reference to the drawings and particularly to FIG. 1, the general type of rolling liquid transporter illustrated comprises a pair of wheels 10 and 11 disposed in side by side or cart wheel fashion and journalled upon a single axle, not illustrated, which extends through the hubs 12 and 13 of both wheels. Each wheel comprises a metal hub, later to be described in detail, and a pneumatic tire mounted upon the hub there being tire beads engaged with hub flanges at the opposite ends of the hub. The tires are formed of elastic or resilient material, such as natural or synthetic rubber or plastic, reinforced with suitable carcass structure and are of large capacity, each of the tires illustrated in FIG. 1, for example, having an internal capacity of 500 gallons of liquid.

A towing tongue 14 is secured at one end to the axle between the wheels 10 and 11 and is provided at its upper end with a lunette 15 for connecting the tongue to a towing vehicle. In the arrangement illustrated, the tongue carries a tool box 16, a compressed air tank 17, a motor driven and a hand driven air pump, not illustrated, and a brake air supply reduction valve 18. The tongue may also carry an automotive type storage battery and the brakes may be electrically operated rather than pneumatically operated. Each of the wheel hubs is provided at its inner end with a suitable pneumatic, hydraulic, or electric brake for retarding the transporter but the brakes, being conventional in construction, are omitted in the subsequent illustration of the hub structure for the purpose of simplifying the drawings.

FIGS. 2 through 7 inclusive show the hub structure of one of the transporter wheels with the present invention applied to such structure. The hub is journalled on the corresponding end of the fixed tubular or hollow axle 20 and comprises a pair of spaced apart, annular flanges 21 and 22 and an intermediate sleeve or tubular structure 23 extending between and terminally secured at its ends to the flanges 21 and 22 to rigidly hold these flanges in spaced apart, parallel relationship to each other. The tire 24 is provided with bead formations 25 and 26 surrounding the central openings in the corresponding side walls of the tire and these bead formations are secured to the hub flanges 21 and 22 by being clamped between the corresponding peripheral rims of the flanges and inner flat rings 27 and 28 pressed against the tire beads by suitable means such as the bolts 30 extending through the peripheral portions of the flanges.

Figure 5:
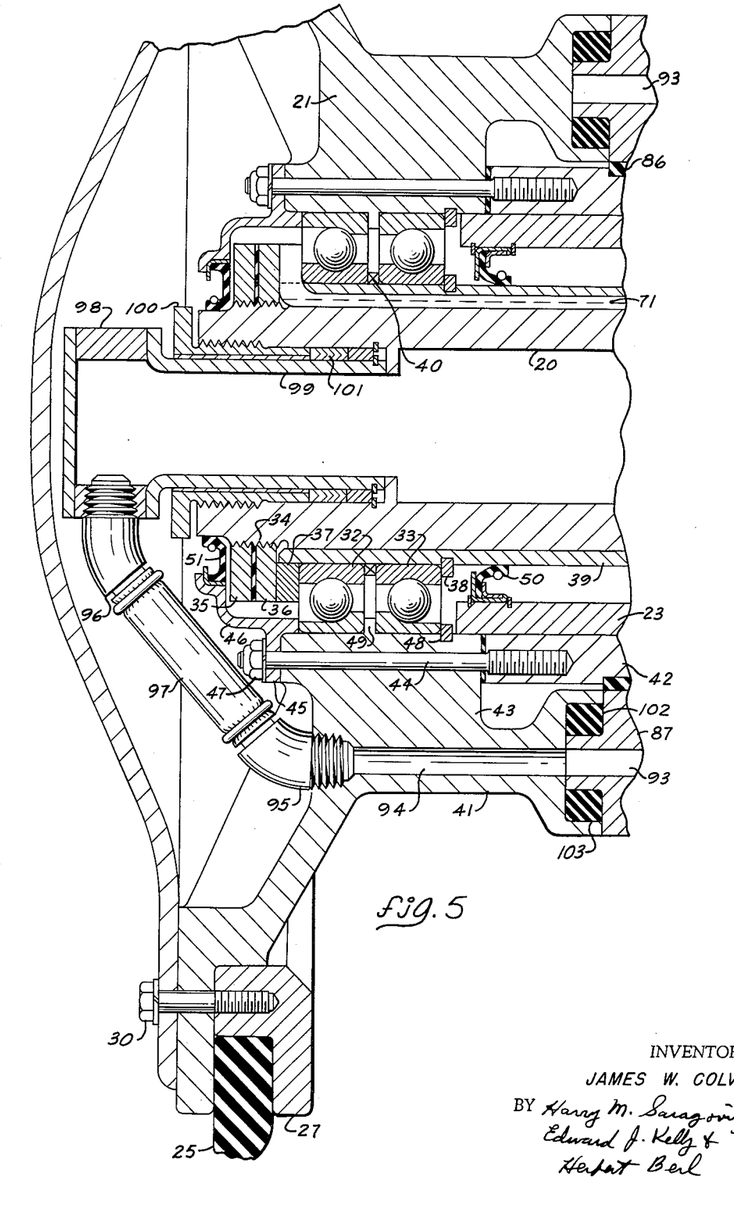
FIGS. 5, 6, and 7 together constitute a longitudinal cross-sectional view on an enlarged scale substantially on a plane indicated by the line 6—6 on FIG. 4.

As the two wheels, including the hubs, are identical in construction, only one has been illustrated in detail. Referring to FIG. 5, the flange 21 at the outer end of the hub is journalled on the outer end portion of the fixed axle 20 by a pair of antifriction ball bearings 32 and 33 arranged in side by side relationship and preloaded to absorb thrust in either direction between the axle and the wheel hub. The outer end portion of the axle 20 is externally threaded, as indicated at 34, and receives a pair of mutually locking units 35 and 36, the inner one 36 of which bears against a spacer 37 interposed between the nut and the adjacent edge of the inner race of the bearing 32. The edge of the inner race of the bearing 33 remote from the bearing 32 bears against a lock ring 38 set in a groove in a skirt 39 which surrounds the axle 20 and is interposed between the axle and the inner races of the bearings 32 and 33. A spacer ring 40 is interposed between the two inner bearing races and is slidable on the sleeve 39.

The flange 21 is provided with an integral, inwardly projecting annular formation 41 and the corresponding end of the intermediate sleeve 23 extends into this annular formation. A cylindrical sleeve or spacer 42 surrounds and is rigidly secured upon the end portion of the sleeve 23 projecting into the annular formation 41 and the outer end of this spacer is spaced from the corresponding end of the sleeve 23 and bears against an internal annular shoulder 43 in the formation 41. The spacer 42 is drilled and tapped at annular intervals around its end bearing against the shoulder 43 and bolts 44 extend through corresponding bolt holes in the formation 41 and into the tapped openings in the sleeve 42. These bolts extend through apertures in an annular flange 45 on an annular seal cover 46 and are provided with screw threaded outer end portions receiving nuts 47 which compress the flange 45 against the outer end of the inner portion of the annular formation 41 and hold the end of the cylindrical member 42 against the shoulder 43. As the member 42 is rigidly secured to the hub sleeve 23, the bolts 44 are effective to rigidly secure the hub flange 21 to the corresponding end of the intermediate sleeve so that the sleeve rigidly supports the flange. This provides true rotation for the bearings 32 and 33 and prevents the misalignment of the inner and outer races of the bearings. A snap ring 48 seated in a groove in the inner surface of the formation 41 bears against the inner end of the outer race of the bearing 33 and the cover 46 has an annular shoulder which bears against the outer end of the outer race of the bearing 32. With this arrangement, tightening of the nuts 47 on the bolts 44 forces the outer bearing races toward each other and against an annular rib 49 formed on the inner surface of the formation 41 so that the hub flange 21 is positionally secured relative to the bearings 32 and 33. The nut 36 and spacers 37 compress the inner races of the bearings between the spacer and the snap ring 38, thus urging the inner races of the bearings toward each other and preloading the bearings, the spacer ring 40 having a thickness somewhat less than the rib 49 so that a definite preloading of the bearings can be obtained. It will be noted that the two bearings 32 and 33 are constructed to withstand thrust forces in respectively opposite directions so that both directions of longitudinal thrust between the fixed axle 20 and the wheel hub is effectively resisted.

An annular seal 50 is secured between the sleeve member 23 and the cylindrical skirt 39 inwardly of the bearings 32 and 33 and a similar annular seal 51 is disposed between an annular shoulder on the seal cover 46 and the end portion of the axle 20 to protect the bearings 32 and 33. The seal 50 not only protects the bearings against foreign matter, but also is effective to retain compressed air in the annular chamber between the outer surface of the axle 20 and the inner surface of the intermediate sleeve 23 as will presently appear.

Figure 6:
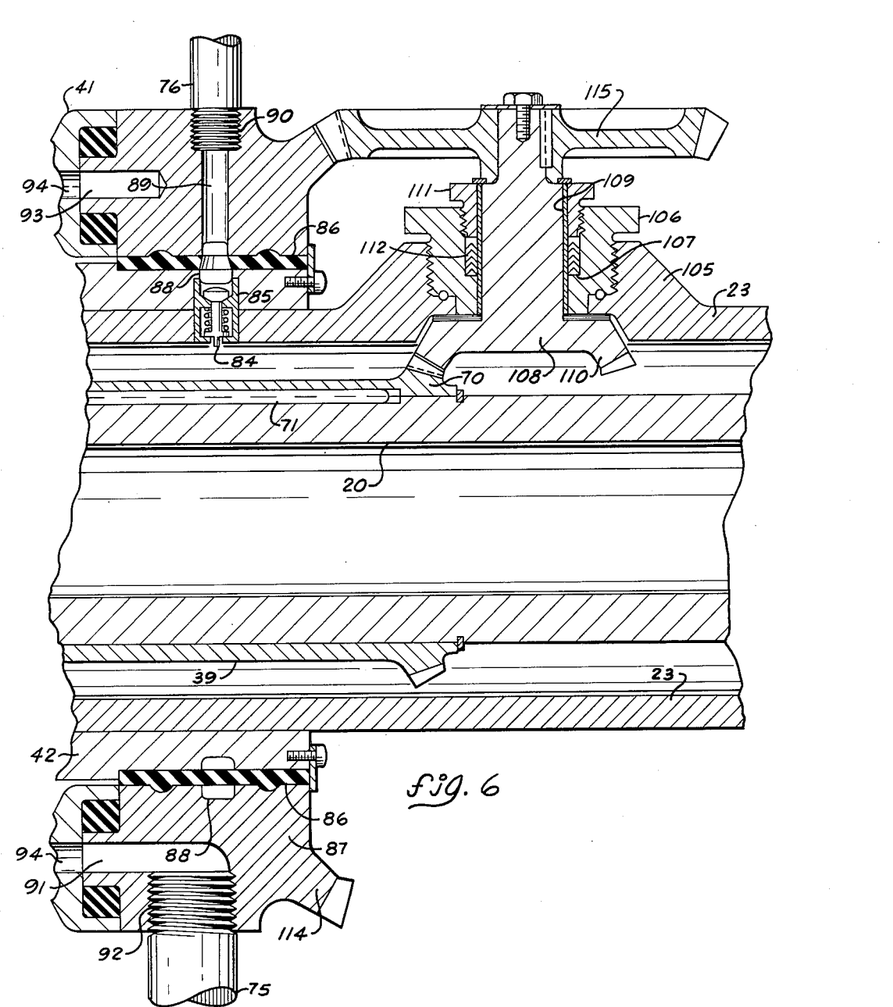
Figure 7:
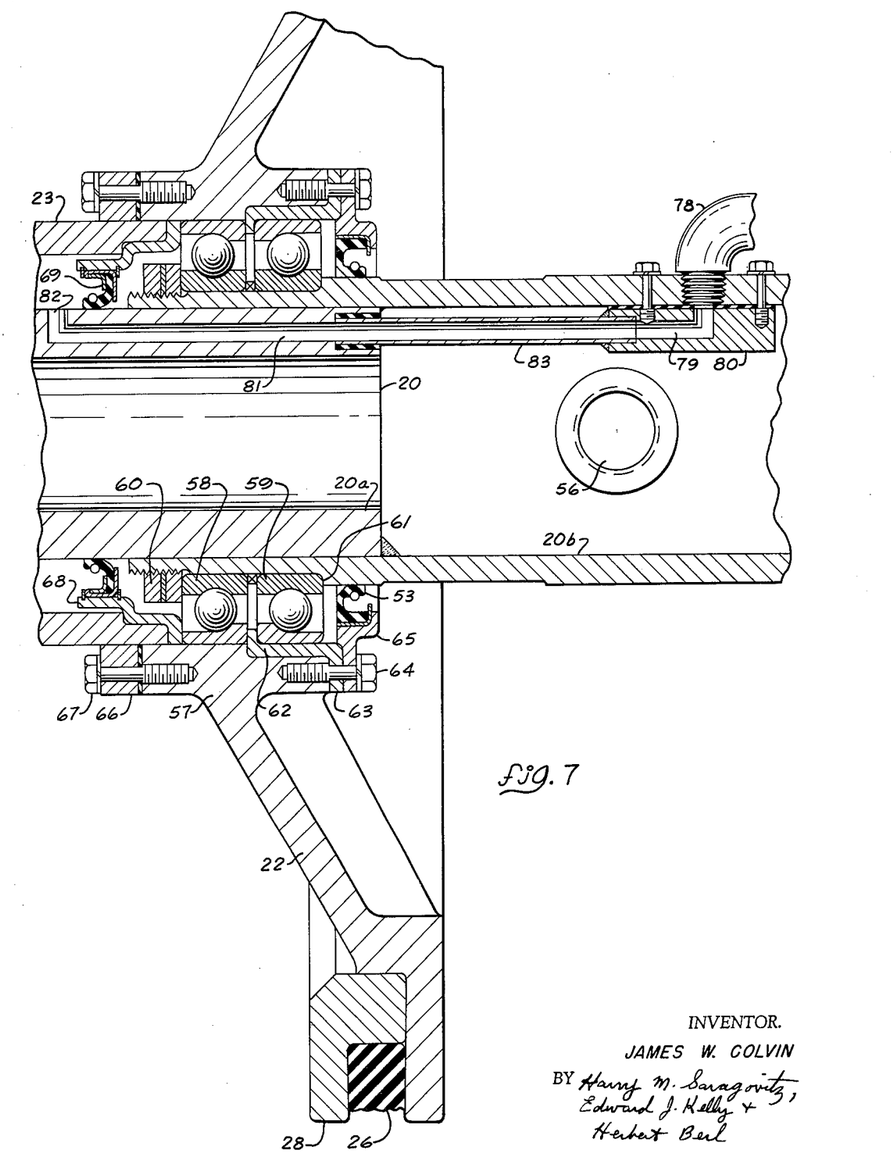

FIG. 6 shows the intermediate portion of the hub structure extending from the portion shown in FIG. 5 to the inner portion shown in FIG. 7 which inner portion includes the hub flange 22.

As illustrated, the axle 20 comprises a thick walled tube 20a which terminates in a plane adjacent the outer surface of the flange 22 and an extension sleeve 20b, which overlaps the corresponding end portion of the tube 20a, extends outwardly from the hub flange. The sleeve 20b is provided at its distal end with an annular flange formation 55 which is welded or otherwise rigidly secured to a box-like bracket to which the corresponding end of the tongue 14 is secured. This structure is not specifically illustrated as it does not constitute any definite part of the present invention. Between the tongue mounting box structure and the hub flange 22, the sleeve 20b is apertured and provided with a hose nozzle connection or fitting 56 through which liquid may be discharged from the interior of the hollow fixed axle into one end of a hose connected at its other end to a fuel tank or other suitable receptacle. Liquid may also be fed into the tank through the fitting 56 and it is contemplated that a liquid meter can be connected between the hose nozzle fitting and the axle sleeve to measure liquid fed into and withdrawn from the tank so that an accurate indication of the amount of liquid in the transporter can be provided at all times.

The hub flange 22 is provided with a concentric, cylindrical formation 57 which can be much smaller than the formation 41 of the outer flange 21. A pair of antifriction ball bearings 58 and 59 are disposed in side by side relationship between the hub flange formation 57 and the inner end portion of the axle extension sleeve 20b and are secured in this position by a nut and lock nut assembly 60 which is threaded onto the externally screw threaded inner end of the sleeve 20b and compresses the inner races of bearings 58 and 59 between this assembly and an outer shoulder 61 on the sleeve 20b.

An annular member 62 is disposed in the outer portion of the hub flange formation 57 and has at one end an inwardly directed annular flange seated between the outer races of the bearings 58 and 59. At its other end, this member 62 has an outwardly directed annular flange 63 and is provided with angularly spaced apart apertures through which cap screws 64 extend. These cap screws also extend through apertures in an outwardly extending annular flange on a seal cover member 65 and are threaded into tapped wells in the flange formation 57. A seal 53 is held in the inner portion of seal cover 65 and bears against axle sleeve 20b to seal the outer side of bearing 59.

An annular collar 66 is rigidly secured on the hub sleeve 23 near the corresponding end of this sleeve and this collar is provided with angularly spaced apart apertures through which cap screws 67 extend. The cap screws 67 are threaded into tapped wells in the inner end portion of the flange formation 57 and rigidly secure the flange 22 to the corresponding end of the hub sleeve 23. With this construction, the two hub flanges are rigidly secured to the hub sleeve 23 at the corresponding opposite ends of this sleeve and a rigid hub is provided which supports all of the antifriction bearings for true rotation.

An annular member 68 is disposed within the end portion of the hub sleeve 23 to which the collar 66 is attached and this member has at one end an outwardly extended annular flange which is disposed between the end of the sleeve 23 and the adjacent end of the outer race of the bearing 58. Intermediate its length the member 68 is provided wtih an annular shoulder which accommodates this member to a shoulder provided in the end portion of the sleeve 23 and at its end remote from the bearing 58 the member 68 is provided with a cylindrical portion which receives the outer surface of a seal 69 effectively interposed between the hub sleeve 23 and the fixed axle 20. This seal protects the inner end of bearings 58 and 59 and also serves to retain compressed air in the annular space between the axle 20 and the hub sleeve 23 and between the two seals 50 and 69, as will presently appear.

With the above described arrangement, when the nuts 47 are removed from the bolts 44, the seal cover 46 removed from the bolts, the nut 36 and lock nut 35 removed from the end of the axel 20 and the cap screws 64 removed from the portion 57 of the hub flange 22, the entire hub with the tire mounted in position thereon can be slipped off the axle 20 and thereby disassembled from the transporter. The bearings 58 and 59 will remain on the axle but the bearings 32 and 33 will remain in the hub and be removed from the axle when the wheel is pulled off the axle.

The skirt 39 surrounding the inner axle 20 has at its inner end a beveled gear formation 70 and is held against rotation relative to the axle 20 by an elongated spline or key 71. This skirt and gear formation also slides off the axle 20 when the wheel is withdrawn from the axle. After the wheel has been withdrawn from the axle, the tire can be removed from the wheel and wheel hub then disassembled if desired.

In order for liquid to be effectively withdrawn from the tire of the transporter, a flexible liquid conduit 75 extends from the hub downwardly toward the inner surface of the tire and an air conduit 76, which is preferably flexible, extends from the hub upwardly toward the top portion of the inner surface of the tire. Compresesd air is supplied to the interior of the tire through the compressed air conduit 76 and forces the level of liquid in the tire downwardly so that liquid near the bottom of the inner surface of the tire is forced upwardly through the liquid conduit 75 and discharged from the transporter wheel assembly in a manner to be presently described.

Compressed air from a suitable pump or tank mounted on the transporter tongue, as previously mentioned, is fed through a suitable conduit 78 elbowed through an aperture in the axle sleeve 20b into a channel 79 provided in a block 80 secured to the inner surface of the sleeve 20b. A channel 81 is provided in the adjacent end portion of the axle tube 20a and is elbowed, as indicated at 82, into the annular space between the axle tube 20a and the hub sleeve 23 and between the two seals 50 and 69. A tubular conduit 83 is interposed between the adjacent ends of the channels 79 and 81 to provide a continuous conduit for the compressed air. From the annular space the compressed air flows past one or more check valves 84 mounted in valve housings 85 secured in corresponding radially disposed openings in the axle sleeve 23. A plain or sleeve bearing 86 is interposed between the outer surface of the inner end portion of the cylindrical spacer 42 and the corresponding cylindrical inner surface of an annular gear 87 which completely surrounds the cylindrical or sleeve bearing 86. This bearing is provided with apertures which form continuous passages from the valves 84 into an annular groove or channel 88 provided in the inner surface of the gear member 87. From the channel 88 a radially disposed channel 89 leads to the inner end of the internally screw threaded recess 90 in the gear member 87 into which the inner end of the compressed air conduit 76 is threaded. The gear member 87 is held against rotation so that the compressed air conduit 76 always extends upwardly from the hub and the valve or valves 84, channel 88 and openings connecting the valves to this channel provide a continuously open passage for the flow of compressed air from the pump connected conduit 78 to the internal conduit 76 to charge the interior of the transporter wheel with compressed air at selected pressure. The check valve 84 not only precludes the return flow of compressed air from the interior of the tire to the annular space between the hub sleeve and the axle but also precludes the leakage of any liquid, such as engine fuel, from the interior of the tire into the annular space from which it might leak past the seals 50 and 69 into the ball bearings at the ends of the hub.

The liquid conduit 75 extends downwardly from the non-rotating gear member 87 and at its upper end is connected with a channel 91 which extends radially from the internally screw threaded opening 92 in the gear member into which the upper end of the conduit 75 is threaded to the side of the gear member adjacent the hub flange formation 41. This channel 91 is connected to a continuous annular channel 93 in the gear member which channel is maintained filled with liquid from the conduit 75. Liquid from this channel flows into bores 94 extending longitudinally through the flange formation 41. The bores 94 extend through the annular formation 41 and at their outer ends are connected by means of conduits including elbow members 95 and 96 and tubes 97 to the interior of a gland 98 disposed at the outer end of the fixed axle 20. This gland has a sleeve 99 which extends into the end of the axle and the axle is internally screw threaded to receive a gland nut 100 which compresses a packing 101 between the sleeve 99 and the inner surface of the axle 20 to provide a leak-proof connection between the gland and axle. Since the conduits, including the elements 95, 96, and 97, are rigidly secured to the hub flange and rotated with this flange when the transporter is in motion, the gland 98 will rotate relative to the axle 20 and the seal 101 must prevent leakage between the relatively rotating cylindrical members 20 and 99. After the liquid is forced into the interior of the axle 20 through the radially disposed conduits and the gland 98, it flows through the axle to the fittting 56 from which it is discharged into a fuel line or hose, as described above. Obviously, by reversing the flow, liquid may be fed into the transporter through the same channels.

After the liquid is exhausted through fitting 56 pressurized air may likewise be exhausted. Upon refilling of the tire the liquid compresses the air to a small volume at the top of the tire. If desired, means could be used to vent this air.

In order to maintain the desired pressure in the interior of the transporter wheel annular seals 102 and 103 are provided between the mating faces of the gear member 87 and the annular hub flange formation 41 but these seals are not critical since any liquid leaking from between the mating faces of these elements will merely flow back into the interior of the tire and will not leak outside of the tire or hub or into any position from which it could leak into the antifriction bearings.

Since the axle 20 is fixed or non-rotational and since hub sleeve 23 rotates with the wheel and relative to the axle 20 a problem was involved in maintaining the conduits 75 and 76 against rotation with the wheel while disposed outside of the intermediate hub sleeve 23.

The hub sleeve 23 is formed intermediate its length with an apertured and internally screw threaded boss 105 into which a hollow plug 106 is threaded. The bore of plug 106 is counterbored to provide an internal annular shoulder 107 for a purpose to be presently explained. A gear element 108 has its shaft portion journalled in the plug 106 by a bearing sleeve 109 and includes a beveled gear portion 110 disposed in the space between the axle 20 and the hub sleeve 23 and meshing with the gear formation 70 on the inner end of the skirt 39. The enlarged portion of the bore of the plug 106 is screw threaded and receives a gland nut 111 which comprises a packing 112 against the shoulder 107 to provide a fluid tight seal between the gear shaft and the plug 106. The nonrotating gear element 87 is provided with a beveled gear formation 114 and a beveled gear 115 is mounted on the end of the shaft of the gear element 108 remote from the gear formation 110 and meshes with the gear formation 114 on the gear member 87. The ratio of the number of gear teeth in the gear formation 70 to the number of gear teeth in the gear 110 is the same as the ratio of the number of gear teeth in the gear formation 114 to the number of gear teeth in the gear 115. As the sleeve 23 is rotated around the axle 20 carrying the gear 108 with it the meshing of the gear 110 with the gear formation 70 causes the gear 108 to rotate in the direction to feed back the gear member 87 as the gear 115 rotates about the rotational axis of the transporter wheel. With the gear tooth ratios described above, the rate of feed back of the gear member 87 is such that this gear member is held against any rotational movement even though the hub sleeve 23 rotates around the axle 20.

By placing the hub sleeve 23 between hub flanges and rigidly securing this sleeve at its end to the corresponding flanges, the entire hub is made rigid and the ball bearings are so adequately supported that skewing or other misalignment of the bearing races is eliminated and the bearings are not galled in use. At the same time, by maintaining the space in which the ball bearings are located entirely free of liquid fuel, adequate amounts of lubricant will be retained in these bearings and the bearings will not run dry nor be adversely affected by the presence of volatile liquid fuel.

While a suitable embodiment of the invention has been herein above described and has been illustrated in the accompanying drawings for the purpose of disclosure, it is to be understood that the scope of the invention is not limited to the particular embodiment so described and illustrated but is commensurate with the scope of the appended claims.

I claim:

1. In a liquid transporter having wheels including flexible pneumatic tires in which the liquid load is carried and hubs upon which the tires are mounted, a hollow axle upon which the hubs are journalled, and a tongue secured at one end to said axle and projecting at right angles from said axle between said wheels, a wheel hub construction comprising spaced apart flanges arranged to peripherally engage the bead formations of the corresponding tire, antifriction bearings interposed between each of said flanges and said axle, a hub sleeve extending between and terminally secured to said flanges in surrounding relationship to said axle, an annular member journalled on said sleeve, a compressed air conduit extending upwardly from said annular member, channel means connecting said compressed air conduit to a source of compressed air outside of said wheel, a liquid conduit extending downwardly from said annular member, channel means connecting said liquid conduit to the interior of said hollow axle and extending around said antifriction bearings, and means acting between said axle and said hub sleeve and connected to said annular member holding said annular member against rotation during rotation of the corresponding wheel.

2. In combination with a nonrotating hollow axle, a wheel journalled on said axle and comprising a pneumatic tire of flexible construction adapted to contain liquid, a hub including a pair of tire engaging annular flanges, antifriction bearings disposed within said flanges and surrounding said axle, a hub sleeves extending between and terminally joined to said hub flanges to maintain said flanges in rotational alignment on said bearings, an annular member journalled on said hub sleeve, gear means acting through said sleeve from said axle to said annular member restraining said annular member against rotation during rotation of said wheel, a liquid conduit extending downwardly from said annular member to conduct liquid from the lower portion of said tire to said annular member, a compressed air conduit extending upwardly from said annular member into the upper portion of said tire, channel means extending through said axle, said sleeve and said annular member from a source of compressed air to said compressed air conduit and including a check valve precluding flow of fluid through said channel means from the interior of said tire to the interior of said hub sleeve, and channel means leading from said annular member around the corresponding antifriction bearings to the outer end of said hollow axle for conducting liquid from said tire into said hollow axle, said hollow axle being provided with a liquid dispensing opening outside of the corresponding wheel.

3. A hub structure for a pneumatic wheel adapted to be journalled on a fixed axle and comprising tire engaging flanges, a hollow sleeve extending between and terminally secured to said flanges to rigidly maintain and flanges in spaced apart and parallel relationship to each other, an annular member journalled on said sleeve between said flanges, means carried by said hub and effective to maintain said annular member against rotation during rotation of said wheel, and means precluding passage of fluid through said sleeve.

4. A hub structure adapted to be journalled on an axle and carry a pneumatic tire of flexible construction comprising a pair of tire engaging annular flanges, a hub sleeve extending between and terminally secured to said flanges to rigidly maintain said flanges in spaced apart and parallel relationship to each other, a fluid conducting member journalled on said hub, means maintaining said fluid conducting member against rotation during rotation of said wheel, and means providing for the flow of fluid through said member between the interior and exterior of said wheel while precluding passage of fluid from the interior of said wheel to the interior of said hub sleeve.

5. In combination with a hollow non-rotatable axle and a wheel journalled on said axle and including a pneumatic tire adapted to contain a load of liquid and compressed air, means firmly journalling said wheel on said axle against deterioration of wheel bearings while providing for discharge of liquid from said wheel while the wheel is in rolling motion comprising a wheel hub of substantially integral construction including spaced apart annular flanges peripherally engaging the bead formations of said tire and a hub sleeve extending between and terminally joined to said flanges in annularly spaced relationship to said axle, antifriction ball bearing assemblies within each hub flange journalling said flanges upon said axle, fluid seals between said flanges and said axle at the opposite ends of each of said ball bearing assemblies to preclude passage of compressed air, wheel carried liquid and other foreign material into said bearings, an annular member journalled on said bearing sleeve and having separate annular channels therein, a compressed air conduit extending upwardly from said annular member and connected to one of the annular channels therein, channel means including at least one one-way valve connecting said one annular channel to a source of compressed air, a liquid discharge conduit extending downwardly from said annular member and connected to the other annular channel therein, channel means extending through the outer hub flange and from the outer side of said outer hub flange into the outer end of said hollow axle connecting said liquid discharge conduit to the interior of said hollow axle, and gear means extending through said hub sleeve from said hollow axle to said annular member maintaining said annular member against rotation during rotation of said wheel on said axle.

6. The arrangement set forth in claim 5, wherein said gear means includes an annular beveled gear surrounding said axle and held against rotation, a gear shaft extending through and journalled in said hub sleeve, a first beveled gear on said shaft meshing with the gear on said axle, an annular beveled gear on said annular member, and a second beveled gear on said shaft meshing with the beveled gear on said annular member, the ratio between the number of teeth on said axle carried gear and said first beveled gear being the same as the ratio between the number of teeth on the gear on said annular member and the number of teeth on said second beveled gear.

7. In combination with a nonrotatable axle, a rotatable sleeve surrounding and journalled on said axle in annularly spaced relationship thereto, and an annular member surrounding and journalled on said sleeve, gear means acting through said sleeve between said axle and said annular member maintaining said annular member against rotation during rotation of said sleeve relative to said axle.

8. In combination with a nonrotatable axle, a rotatable sleeve surrounding and journalled on said axle in annularly spaced relationship thereto, and an annular member surrounding and journalled on said sleeve, gear means acting through said sleeve between said axle and said annular member maintaining said annular member against rotation during rotation of said sleeve relative to said axle and comprising an annular gear surrounding and secured to said axle, a gear element disposed between said axle and said sleeve and meshing with said annular gear, said gear element having a shaft extending through and journalled in said sleeve for rotation about an axis perpendicular to the axis of rotation of said sleeve, a second gear on said shaft outside of said sleeve, and a gear on said annular member meshing with said second gear.

9. In combination with a nonrotatable axle, a rotatable sleeve surrounding and journalled on said axle in annularly spaced relationship thereto, and an annular member surrounding and journalled on said sleeve, gear means acting through said sleeve between said axle and said annular member maintaining said annular member against rotation during rotation of said sleeve relative to said axle and comprising an annular gear surrounding and secured to said axle, a gear element disposed between said axle and said sleeve and meshing with said annular gear, said gear element having a shaft extending through and journalled in said sleeve for rotation about an axis perpendicular to the axis of rotation of said sleeve, a second gear on said shaft outside of said sleeve, and a gear on said annular member meshing with said second gear, the ratios of said gears and the direction of rotation thereof when said sleeve rotates relative to said axle being such as to feed back said annular member at the same rate as which said sleeve rotates relative to said axle.

References Cited by the Examiner

UNITED STATES PATENTS

| 2,952,468 | 9/60 | Albee | 280—5 |
| 3,059,942 | 10/62 | Kirk et al. | 280—5 |

FOREIGN PATENTS

| 55,636 | 5/52 | France. |
| 674,354 | 11/63 | Canada. |
| | | (1st. Add to French Patent No. 977,648) |

BENJAMIN HERSH, *Primary Examiner.*

LEO FRIAGLIA, *Examiner.*